(12) United States Patent
Fann et al.

(10) Patent No.: US 8,018,957 B2
(45) Date of Patent: Sep. 13, 2011

(54) GATEWAY SYSTEM WITH AUTOMATIC DISPATCH MECHANISM AND METHOD THEREOF

(75) Inventors: Kee Lih Fann, Hsinchu County (TW); Yuan Chih Chung, Hsinchu (TW)

(73) Assignee: Myson Century, Inc., Hsinchu (TW)

( * ) Notice: Subject to any disclaimer, the term of this patent is extended or adjusted under 35 U.S.C. 154(b) by 88 days.

(21) Appl. No.: 12/426,529

(22) Filed: Apr. 20, 2009

(65) Prior Publication Data

US 2010/0061384 A1 Mar. 11, 2010

(30) Foreign Application Priority Data

Sep. 11, 2008 (TW) .............................. 97134804 A

(51) Int. Cl.
*H04L 12/28* (2006.01)
*H04L 12/56* (2006.01)
*H04J 3/02* (2006.01)

(52) U.S. Cl. .......... 370/401; 370/392; 370/537
(58) Field of Classification Search ................. 370/392, 370/401, 537

See application file for complete search history.

(56) References Cited

U.S. PATENT DOCUMENTS 4,897,835 A * 1/1990 Gaskill et al. ................. 370/314
2006/0271682 A1 * 11/2006 Choo et al. .................... 709/226

* cited by examiner

*Primary Examiner* — Ronald Abelson
(74) *Attorney, Agent, or Firm* — WPAT, P.C.; Anthony King

(57) ABSTRACT

The method for automatically dispatching frames applied to a gateway comprises the steps of: using a first transceiver module to receive a plurality of frames from a network system; storing the frames in corresponding dispatch registers if at least a portion of the bits of the frames match one of a plurality of predetermined values; scheduling a dispatch order of the dispatch registers in accordance with a dispatch request; and dispatching frames stored in the dispatch registers to a second transceiver module in accordance with the dispatch order.

9 Claims, 4 Drawing Sheets

GATEWAY SYSTEM WITH AUTOMATIC DISPATCH MECHANISM AND METHOD THEREOF

BACKGROUND OF THE INVENTION

1. Field of the Invention

The present invention relates to a gateway system, and more particularly, to a gateway system having automatic dispatch function.

2. Description of the Related Art

A gateway is a network node connecting two different network systems by transforming the format of frames for network packets or the protocol of a network system to ensure the network packets can be safely dispatched to another network system. Because such kind of technology involves many difficult protocol transformations, gateways are among the most complicated and high-end devices in network transmission applications.

Controller area network (CAN) is a network protocol and bus standard, and allows frame communication between subnodes without a host computer. The CAN is initially applied to motor vehicles, and the aforementioned subnodes typically include an engine controller, an air bag, a tire-pressure detector, a brake system, an audio/video system, a window controller and a rear-mirror adjuster. However, with the widespread development of network systems, the CAN is gradually being applied to a range of other, non-automotive fields.

FIG. 1 shows a conventional gateway system applied to the CAN. The gateway system 100 includes a main processor 110, a first transceiver module 120 and a second transceiver module 130. The main processor 110 is connected to the first transceiver module 120 and the second transceiver module 130. The first transceiver module 120 is connected to a first network system 140. The second transceiver module 130 is connected to a second network system 150. In operating the gateway system 100, the first transceiver module 120 receives the frame on a bus of the first network system 140, and then the main processor 110 determines whether it has to instruct the second transceiver module 130 to dispatch the frame to the second network system 150. Because every frame on the bus of the first network system 140 has to be determined by the main processor 110, such operation consumes a lot of computation resources of the main processor 110 and thus a high-performance processor is needed to perform the computation. As a result, the cost of the system is high.

Additionally, the communication protocol of the CAN requires that some subnodes need to report their status regularly. For example, the engine controller and the tire-pressure detector need to regularly report whether the entire operation is normal. Therefore, the gateway system 100 relies on the main processor 110 to dispatch data including the above-mentioned frames regularly, which increases the burden upon the main processor 110.

In short, there is an important need for a design of a gateway system capable of automatically dispatching frames so as to reduce the burden upon the main processor.

SUMMARY OF THE INVENTION

The present invention provides a gateway system having automatic dispatch function and the method thereof. The method mainly resolves the problem of overloading of the main processor.

The gateway system with automatic dispatch mechanism in accordance with one embodiment of the present invention comprises a first transceiver module, a second transceiver module, a first automatic dispatch module, a second automatic dispatch module and a main processor. The first transceiver module is connected to a first network system. The second transceiver module is connected to a second network system. The first automatic dispatch module is configured to automatically dispatch first frames from the first transceiver module to the second transceiver module, wherein at least a portion of the bits of the first frames match one of a plurality of predetermined values. The second automatic dispatch module is configured to automatically dispatch second frames from the second transceiver module to the first transceiver module, wherein at least a portion of the bits of the second frames match one of a plurality of predetermined values. The main processor is configured to control the first transceiver module, the second transceiver module, the first automatic dispatch module and the second automatic dispatch module.

The method for automatically dispatching frames applied to a gateway in accordance with one embodiment of the present invention comprises the steps of: using a first transceiver module to receive a plurality of frames from a network system; storing the frames in corresponding dispatch registers if at least a portion of the bits of the frames match one of a plurality of predetermined values; scheduling a dispatch order of the dispatch registers in accordance with a dispatch request; and dispatching frames stored in the dispatch registers to a second transceiver module in accordance with the dispatch order.

BRIEF DESCRIPTION OF THE DRAWINGS

The invention will be described according to the appended drawings in which.

PREFERRED EMBODIMENT OF THE PRESENT INVENTION

Figure 1:
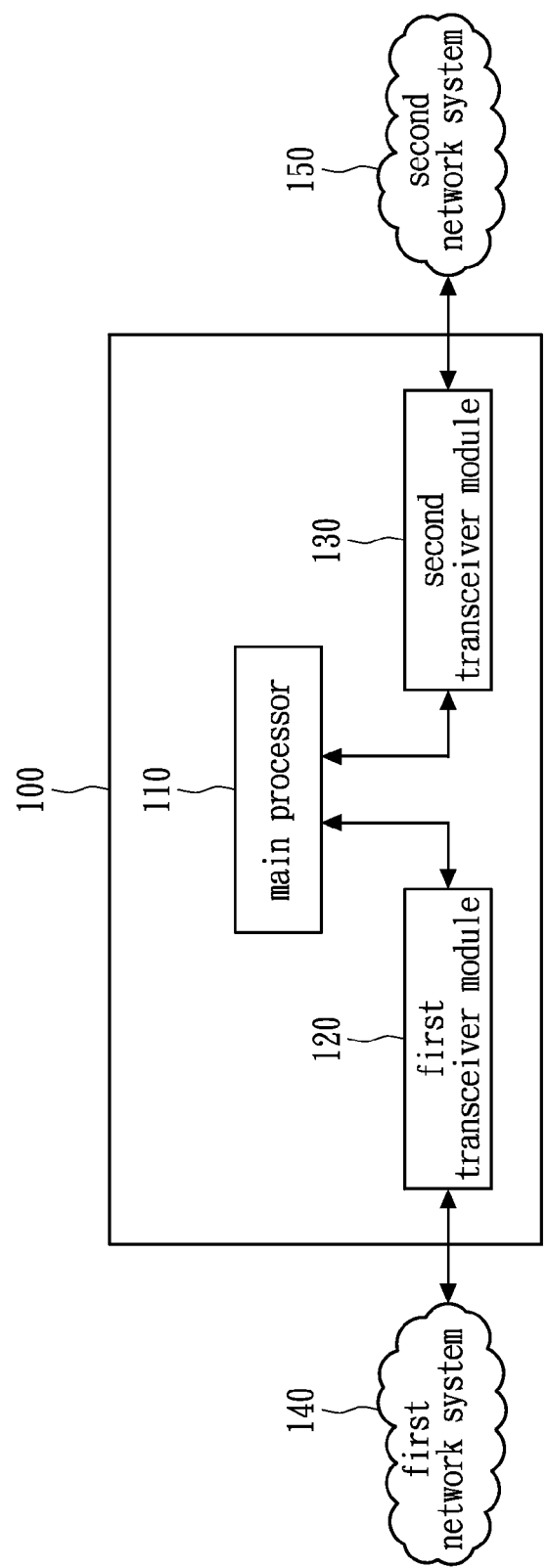
FIG. 1 shows a conventional gateway system applied to the CAN.
Figure 2:
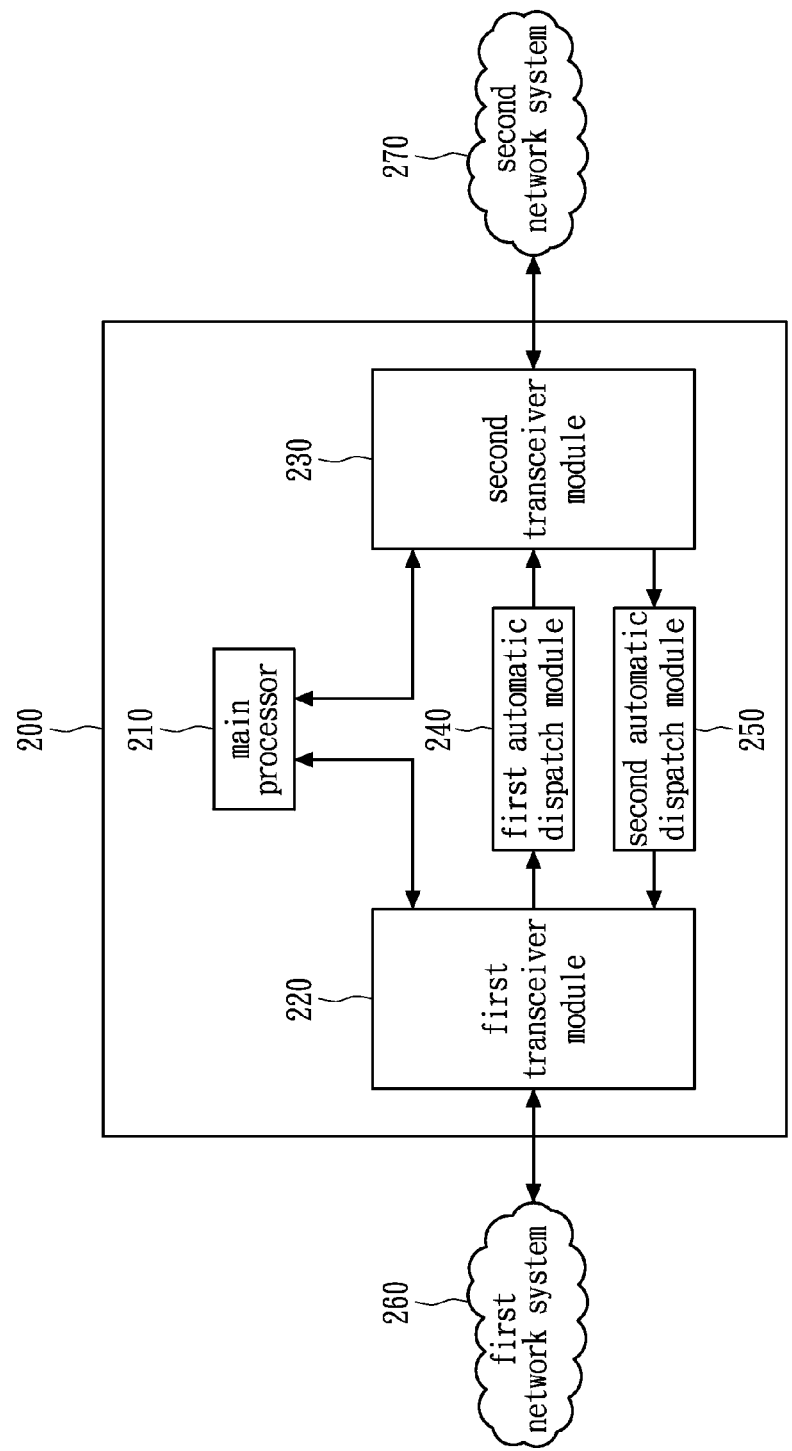
FIG. 2 shows a gateway system with automatic dispatch mechanism in accordance with one embodiment of the present invention.

FIG. 2 shows a gateway system with automatic dispatch in accordance with one embodiment of the present invention. The gateway system 200 can be used in a CAN or a vehicle-based network system, and includes a main processor 210, a first transceiver module 220, a second transceiver module 230, a first automatic dispatch module 240 and a second automatic dispatch module 250. The first transceiver module 220 is connected to a first network system 260. The second transceiver module 230 is connected to a second network system 270. The first automatic dispatch module 240 is connected to the first transceiver module 220 and the second transceiver module 230. The first automatic dispatch module 240 automatically dispatches frames that the first transceiver module 220 receives from the first network system 260, when a portion of bits of those frames match one of a plurality of predetermined values, to the second transceiver module 230. The second automatic dispatch module 250 is connected to the first transceiver module 220 and the second transceiver module 230. The second automatic dispatch module 250 automatically dispatches frames that the second transceiver module 230 receives from the second network system 270, when at least a portion of the bits of those frames match one of a plurality of predetermined values, to the first transceiver module 220. The main processor 210 is connected to and used to control the first transceiver module 220, the second transceiver module 230, the first automatic dispatch module 240 and the second automatic dispatch module 250. Preferably, the first automatic dispatch module 240 transmits frames to the second transceiver module 230 regularly, while the second automatic dispatch module 250 also dispatches frames to the first transceiver module 220 regularly.

Figure 3:
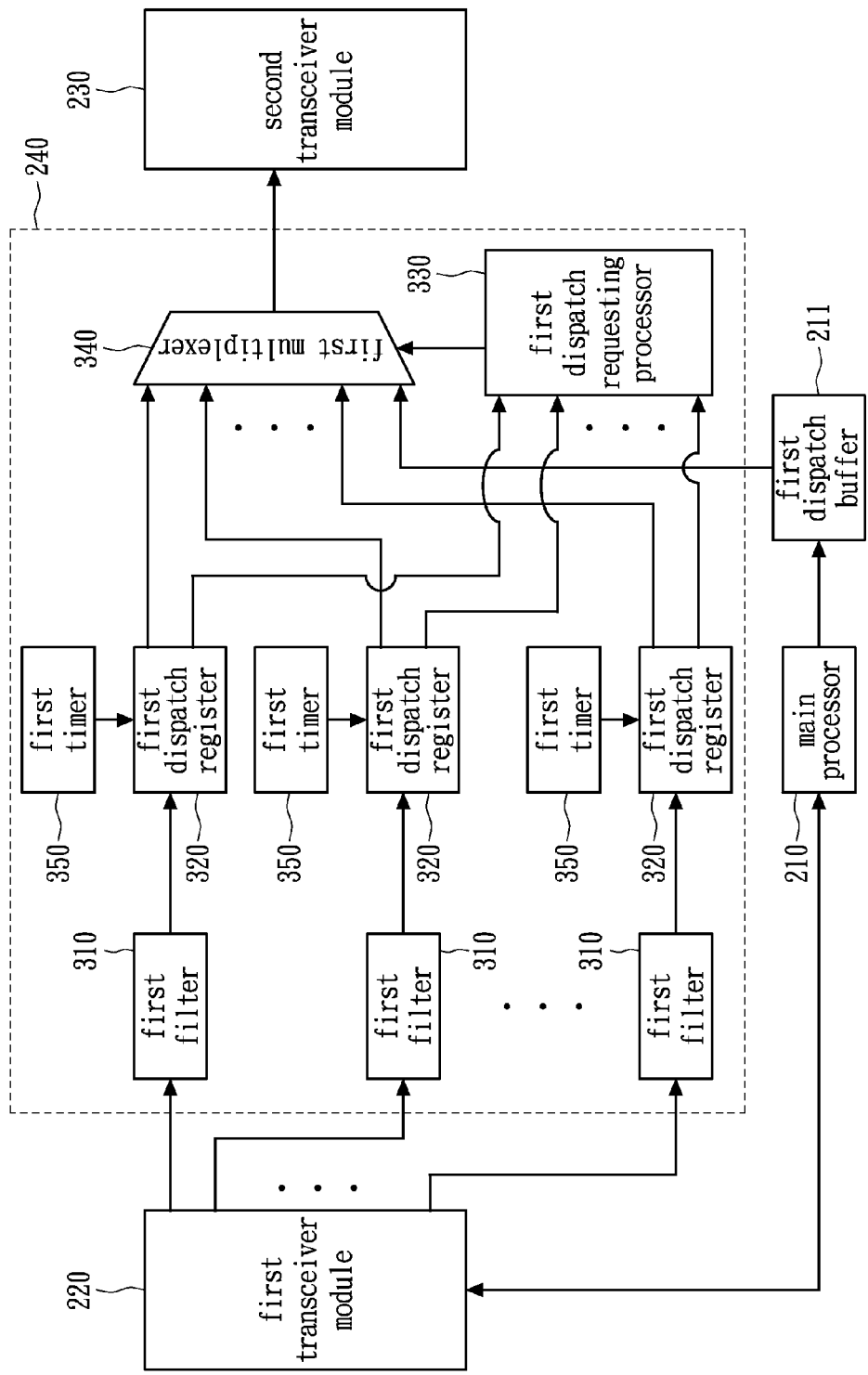
FIG. 3 shows an internal block diagram of the first automatic dispatch module.

FIG. 3 shows an internal block diagram of the first automatic dispatch module 240. The first automatic dispatch module 240 includes a plurality of first filters 310, a plurality of first dispatch registers 320, a first dispatch-requesting processor 330 and a first multiplexer 340. Each of the plurality of the first filters 310 can be set up by the main processor 210 or can be based on one of a plurality of predetermined values. In addition, each of the plurality of the first filters 310 compares the frames on the bus of the first network system 260. If at least a portion of the bits of a frame match the predetermined value of an active first filter 310, then the active first filter 310 stores the frame into a corresponding first dispatch register 320 and sets up an automatic dispatch-requesting bit. The frames of the first dispatch registers 320 are outputted to the first multiplexer 340, and the automatic dispatch request is outputted to the first dispatch requesting processor 330. As soon as the first dispatch requesting processor 330 receives an automatic dispatch request, the first dispatch requesting processor 330 controls the output of the first multiplexer 340 so that the input of the dispatch buffer of the second transceiver module 230 corresponds to the first dispatch register 320 with the automatic dispatch request. If multiple automatic dispatch requests are made, then the first dispatch-requesting processor 330 schedules their order according to an algorithm. The algorithm is not limited to any form. In this embodiment, the first dispatch requesting processor 330 schedules in accordance with the order of the first dispatch registers 320. Preferably, the input of the first multiplexer 340 is further connected to a first dispatch buffer 211 controlled by the main processor 210. After the first dispatch requesting processor 330 handles all dispatch requests, the input of the dispatch buffer of the second transceiver module 230 refers to the first dispatch buffer 211. The priorities of the first dispatch register 320 and the first dispatch buffer 211 are flexible, thus alternatively, the first dispatch buffer 211 can be processed earlier than the first dispatch register 320.

Preferably, the first automatic dispatch module 240 further comprises a plurality of timers 350. The first timers 350 respectively control the first dispatch registers 320 so that the frames and dispatch requests are outputted regularly to meet the user's requirement at a control end in the local area network. Depending upon the application, the first timers 350 are set by the main processor 210 to correspond to different dispatch frequencies. For example, a brake system needs frequent status reports to ensure the safety. In contrast, a window controller does not need a frequent status report.

The structure of the second automatic dispatch module 250 is similar to that of the first automatic dispatch module 240, and includes a plurality of second filters, a plurality of second dispatch registers, a second dispatch requesting processor and a second multiplexer. Preferably, the second automatic dispatch module 250 further comprises a plurality of second timers. The connection and function of the above components are similar to those of the first automatic dispatch module 240.

Figure 4:
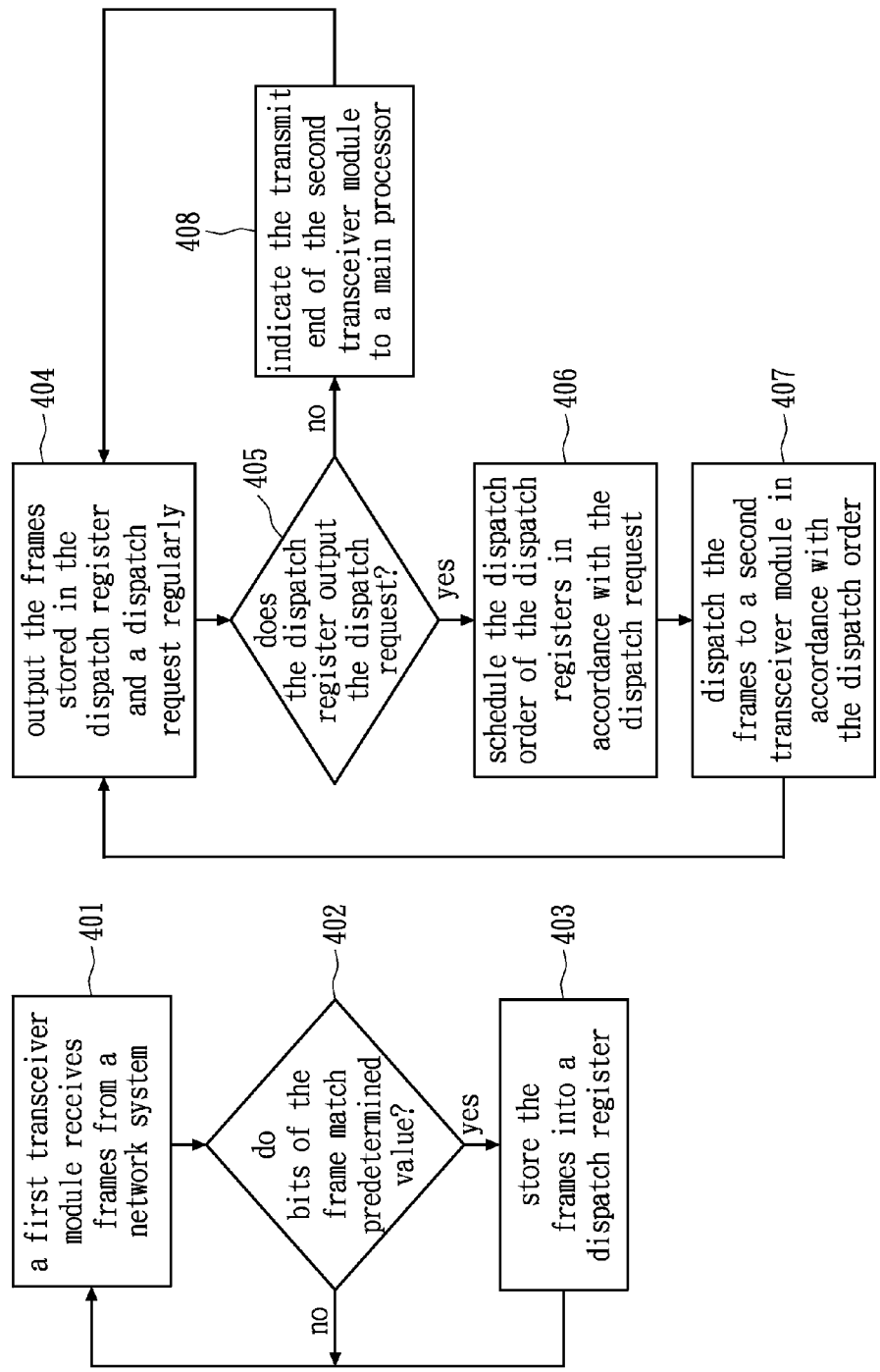
FIG. 4 shows a flow chart of automatically dispatching frames in accordance with one embodiment of the present invention.

FIG. 4 shows a flow chart of automatically dispatching frames in accordance with one embodiment of the present invention. The method is applied to a gateway, which is used to connect two different network systems. The flow chart is divided into two main segments. Addressing the first segment, in step 401, a first transceiver module is used to capture multiple frames from a network system, and then the flow enters step 402. In step 402, it is determined whether a segment of bits of the frames matches one of a plurality of predetermined values. If the answer is affirmative, step 403 is entered; otherwise, the flow goes back to step 401. In step 403, the frames are stored in corresponding dispatch registers, and the flow goes to step 401.

Addressing the second segment, in step 404, the frames stored in the dispatch registers and dispatch requests are regularly outputted, and the flow enters step 405. In step 405, the dispatch register is examined to verify whether the dispatch requests are outputted. If the answer is affirmative, the flow enters step 406; otherwise the flow enters step 408. In step 406, the dispatch order of the dispatch registers are scheduled in accordance with the dispatch requests, and the flow enters step 407. In step 407, the frames stored in the dispatch registers are dispatched to a second transceiver module in accordance with the dispatch order, and then the flow enters step 404. In step 408, the transmit end of the second transceiver module is referred to a main processor, and the flow enters step 404. In addition, if dispatch requests are disabled, the first/second dispatch requesting processor omits messages from the first/second dispatch register.

The present method can be applied to a controller area network or a vehicle-based network system. In addition, the dispatch intervals of the dispatch registers vary according to the requirements of different subnodes which need status reports of different frequencies.

In brief, the automatic dispatch gateway system 200 in accordance with the present embodiments can determine whether to self-dispatch the received frames by the first filters 310. The first dispatch requesting processor 330 can schedule the frames intended for automatic dispatch. In addition, the first timers 350 can control the first dispatch registers 320 to regularly dispatch the frames. The above features can largely reduce the operation overhead of the main processor 210, and therefore, the gateway system 200 need not choose a high-end processor 210 but can still complete its tasks.

The above-described embodiments of the present invention are intended to be illustrative only. Numerous alternative embodiments may be devised by persons skilled in the art without departing from the scope of the following claims.

What is claimed is:

1. A gateway system with automatic dispatch mechanism, comprising:

a first transceiver module connected to a first network system;

a second transceiver module connected to a second network system;

a first automatic dispatch module configured to automatically dispatch first frames from the first transceiver module to the second transceiver module, wherein at least a portion of the bits of the first frames match one of a plurality of predetermined values, wherein the first automatic dispatch module comprises:

a plurality of first filters, each of the first filters corresponding to one of a plurality of predetermined values and outputting frames received from the first transceiver module;

a plurality of first dispatch registers configured to store outputs of the plurality of the first filters;

a first dispatch requesting processor configured to schedule dispatch requests from the first dispatch registers; and a first multiplexer configured to receive frames from the first dispatch register and to output frames to the second transceiver module in accordance with the first dispatch requesting processor;

a second automatic dispatch module configured to automatically dispatch second frames from the second transceiver module to the first transceiver module, wherein at least a portion of the bits of the second frames match one of a plurality of predetermined values, wherein the second automatic dispatch module comprises:

a plurality of second filters, each of the second filters corresponding to one of a plurality of predetermined values and outputting frames from the second transceiver module;

a plurality of second dispatch registers configured to store outputs of the plurality of the second filters;

a second dispatch requesting processor configured to schedule dispatch requests from the second dispatch registers; and a second multiplexer configured to receive frames from the second dispatch registers and to output frames to the first transceiver module in accordance with the second dispatch requesting processor; and a main processor configured to control the first transceiver module, the second transceiver module, the first automatic dispatch module and the second automatic dispatch module.

2. The gateway system of claim 1, wherein the first automatic dispatch module regularly dispatches first frames to the second transceiver module.

3. The gateway system of claim 1, wherein the second automatic dispatch module regularly dispatches second frames to the first transceiver module.

4. The gateway system of claim 1, wherein the first automatic dispatch module further comprises a plurality of first timers, and the first timers are configured to control the first dispatch registers to regularly output frames.

5. The gateway system of claim 1, wherein the first multiplexer is further connected to a first dispatch buffer controlled by the main processor.

6. The gateway system of claim 1, wherein the second automatic dispatch module further comprises a plurality of second timers, and the second timers are configured to control the second dispatch registers to regularly output frames.

7. The gateway system of claim 1, wherein the second multiplexer is further connected to a second dispatch buffer controlled by the main processor.

8. The gateway system of claim 1, which is applied to a controller area network.

9. The gateway system of claim 1, which is applied to a vehicle-based network system.

* * * * *